(12) United States Patent
Kang et al.

(10) Patent No.: US 11,749,908 B2
(45) Date of Patent: Sep. 5, 2023

(54) METHOD FOR DESIGNING NON-UNIFORMLY SPACED LINEAR ARRAY ANTENNA AND COMPUTER-READABLE STORAGE MEDIUM FOR EXECUTING SAME

(71) Applicant: AGENCY FOR DEFENSE DEVELOPMENT, Daejeon (KR)

(72) Inventors: SeYoung Kang, Daejeon (KR); Won Zoo Chung, Daejeon (KR); SeonKyo Kim, Daejeon (KR); CheolSun Park, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 17/686,961

(22) Filed: Mar. 4, 2022

(65) Prior Publication Data
US 2023/0216214 A1 Jul. 6, 2023

(30) Foreign Application Priority Data
Jan. 5, 2022 (KR) .......................... 10-2022-0001388

(51) Int. Cl.
*H01Q 21/08* (2006.01)
*G06N 20/00* (2019.01)
(52) U.S. Cl.
CPC ............. *H01Q 21/08* (2013.01); *G06N 20/00* (2019.01)
(58) Field of Classification Search
None
See application file for complete search history.

(56) References Cited

U.S. PATENT DOCUMENTS 10,819,405 B2 * 10/2020 Cai .................. H04B 7/0617
2016/0094318 A1 * 3/2016 Shattil ................ H04L 27/01
375/267

(Continued)

FOREIGN PATENT DOCUMENTS

| KR | 10-2005-0019644 A | 3/2005 |
|---|---|---|
| KR | 10-2016-0150453 A | 12/2016 |
| KR | 10-195237 B1 | 2/2019 |

OTHER PUBLICATIONS

Office Action of the corresponding Korean Application No. 10-2022-0001388 dated Jun. 19, 2023.

*Primary Examiner* — Wilson Lee
(74) *Attorney, Agent, or Firm* — Knobbe, Martens, Olson & Bear, LLP (57) ABSTRACT

This application relates to a method for designing a non-uniformly spaced linear array antenna. The method includes setting a cost function for spacing between a plurality of antennas comprised in a linear array and for weights for each of the antennas, with limits on side lobe level and bandwidth, and obtaining an initial best solution vector for the cost function under an initial environmental condition based on learning parameters. The method may further include updating the initial best solution vector through reinforcement learning in which a reward value is computed by comparing a sub best solution vector with each of a plurality of solution vectors for the cost function under a sub environmental condition based on the initial best solution vector. The method may further include determining the spacing between the plurality of antennas and the weights for each of the antennas based on the updated initial best solution vector.

14 Claims, 6 Drawing Sheets

(56) References Cited

U.S. PATENT DOCUMENTS

| | | | | |
|---|---|---|---|---|
| 2016/0334498 A1* | 11/2016 | Jamieson | ............ | G01S 5/02213 |
| 2019/0182786 A1* | 6/2019 | Wang | .................... | H04B 7/088 |
| 2020/0119785 A1* | 4/2020 | Varatharaajan | ...... | H04B 7/0617 |
| 2022/0352933 A1* | 11/2022 | Rakib | .................. | H04L 5/0023 |

* cited by examiner

METHOD FOR DESIGNING NON-UNIFORMLY SPACED LINEAR ARRAY ANTENNA AND COMPUTER-READABLE STORAGE MEDIUM FOR EXECUTING SAME

CROSS-REFERENCE TO RELATED APPLICATION

This application claims priority to Korean Patent Application No. 10-2022-0001388, filed on Jan. 5, 2022. The entire contents of the application on which the priority is based are incorporated herein by reference.

BACKGROUND

Technical Field

The present disclosure relates to a method for designing a non-uniformly spaced linear array antenna, that determines spacing between a plurality of antennas constituting a linear array antenna and weights for each of the antennas.

Description of Related Technology

An array antenna is used to enhance the sensitivity of signals transmitted and received from specific directions by increasing directivity and to increase antenna efficiency by canceling interference from other directions. A narrowband array antenna, widely used at present, cannot search across all frequency bands because the antenna spacing is fixed by band frequencies. In order to search signals over a wide range of frequencies, a wideband array antenna is needed to maintain the same performance across all frequency bands.

SUMMARY

The present disclosure provides a method for designing a non-uniformly spaced linear array antenna, that determines spacing between a plurality of antennas constituting a linear array antenna and weights for each of the antennas through reinforcement learning using a cost function, with limits on side lobe level and bandwidth.

According to an embodiment of the present disclosure, the above method may enable a design optimized for scanning a beam at a specific angle in a wide band, by using reinforcement learning to find spacing and weights for linear array antennas. Moreover, this method may make up for the drawbacks of existing cost functions for fitting a specific pattern, by using a cost function that sets limits on bandwidth and side lobe level alone, without use of a specific pattern. Furthermore, the use of a reinforcement learning algorithm may allow for the design of a non-uniformly spaced linear array antenna with high performance compared with a conventional quantum particle swarm optimization (QPSO) algorithm.

DETAILED DESCRIPTION

Many attempts have been made to design weights by using Fourier transform in a uniform linear array (ULA), so as to design a wideband array antenna whose beam pattern is constant regardless of frequency bands. However, there are performance limitations due to the fixed antenna spacing, thus leading to trying methods of designing spacing and weights in a non-uniformly spaced linear array (NUSLA).

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
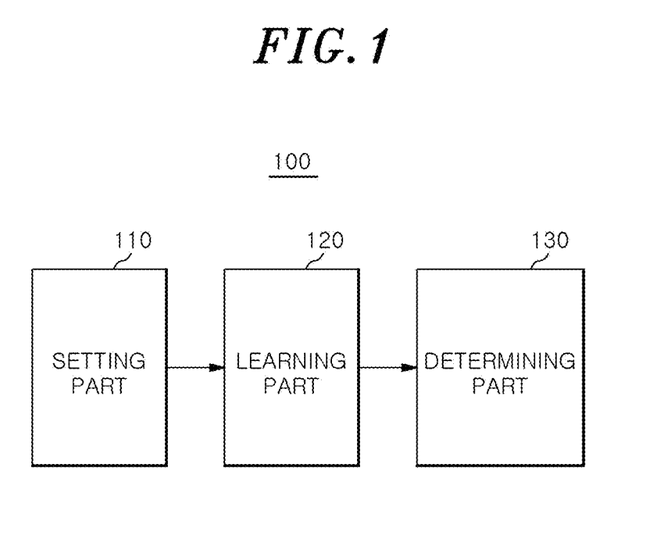
FIG. 1 is a control block diagram of an apparatus for designing a non-uniformly spaced linear array antenna according to an exemplary embodiment of the present disclosure.

FIG. 1 is a control block diagram of an apparatus for designing a non-uniformly spaced linear array antenna according to an exemplary embodiment of the present disclosure.

As mentioned above, a non-uniformly spaced linear array antenna may have an advantage over the uniformly spaced linear array antenna in terms of performance. To this end, it is important to appropriately design spacing and weights for linear array antennas.

In order to find spacing and weights for non-uniformly spaced linear array antennas optimized for wide band, it is necessary to solve a non-linear problem having no closed-form solution. Research for finding a closed-form solution through generalized matrix pencil method (GMPM)-based mathematical approximation has been conducted to find spacing and weights for non-uniformly spaced linear array antennas optimized for wide band. However, a solution found using mathematical approximation does not always guarantee global optimum. Another method for solving a non-linear problem is a search algorithm. However, using the search algorithm in real time is not possible because of unrealistic execution time. Thus, research for various random search algorithms having realistic execution time have been conducted. Moreover, research for finding spacing and weights for non-uniformly spaced linear array antennas optimized for wide band using a quantum particle swarm optimization (QPSO) algorithm has been conducted. In this research, a pencil beam with a constant side lobe level (SLL) was used as a desired pattern, and a cost function for computing a mean square error (MSE) between a pattern acquired for all band frequencies and a preset desired pattern. A global optimum for minimizing such a cost function may be found using a QPSO algorithm, but the use of a cost function for fitting a specific desired pattern may cause an increase in side lobe level, and the performance of the QPSO algorithm is greatly affected by parameter optimization through trial and error.

To overcome this, the apparatus 100 for designing a non-uniformly spaced linear array antenna according to an embodiment of the present disclosure designs a cost function that only satisfies bandwidth and side lobe level without using a specific desired pattern, in order to find spacing and weights for non-uniformly spaced linear array antennas optimized for scanning a beam at a specific angle in a wide band, and uses a reinforcement learning-based modified reinforcement learning algorithm (MORELA) specialized to find global optimum. The QPSO algorithm does not always ensure global optimum since its performance is affected by parameters, but the MORELA has a higher chance of finding global optimum than the QPSO algorithm due to the search and reward characteristics of reinforcement learning.

Hereinafter, a construction of the apparatus 100 for designing a non-uniformly spaced linear array antenna according to an embodiment of the present disclosure will be described with reference to FIG. 1.

Referring to FIG. 1, the apparatus 100 for designing a non-uniformly spaced linear array antenna according to an embodiment of the present disclosure may include: a setting part 110; a learning part 120; and a determining part 130.

The setting part 110 may set a cost function for spacing between a plurality of antennas constituting a linear array and for weights for each of the antennas, with limits on side lobe level and bandwidth.

The learning part 120 may obtain an initial best solution vector for the cost function under an initial environmental condition based on learning parameters, and may update the initial best solution vector through reinforcement learning in which a reward value is computed by comparing a sub best solution vector with each of a plurality of solution vectors for the cost function under a sub environmental condition based on the initial best solution vector.

The determining part 130 may determine the spacing between the plurality of antennas and the weights for each of the antennas based on the updated initial best solution vector.

The apparatus 100 for designing a non-uniformly spaced linear array antenna according to an embodiment of the present disclosure may be implemented by a computing device comprising a memory including instructions programmed to execute these functions and a microprocessor executing these instructions.

Thus far, the construction of the apparatus 100 for designing a non-uniformly spaced linear array antenna according to an embodiment of the present disclosure has been described.

Hereinafter, a method for designing a non-uniformly spaced linear array antenna, which is executed by the apparatus 100 for designing a non-uniformly spaced linear array antenna according to an embodiment of the present disclosure, will be described.

Figure 2:
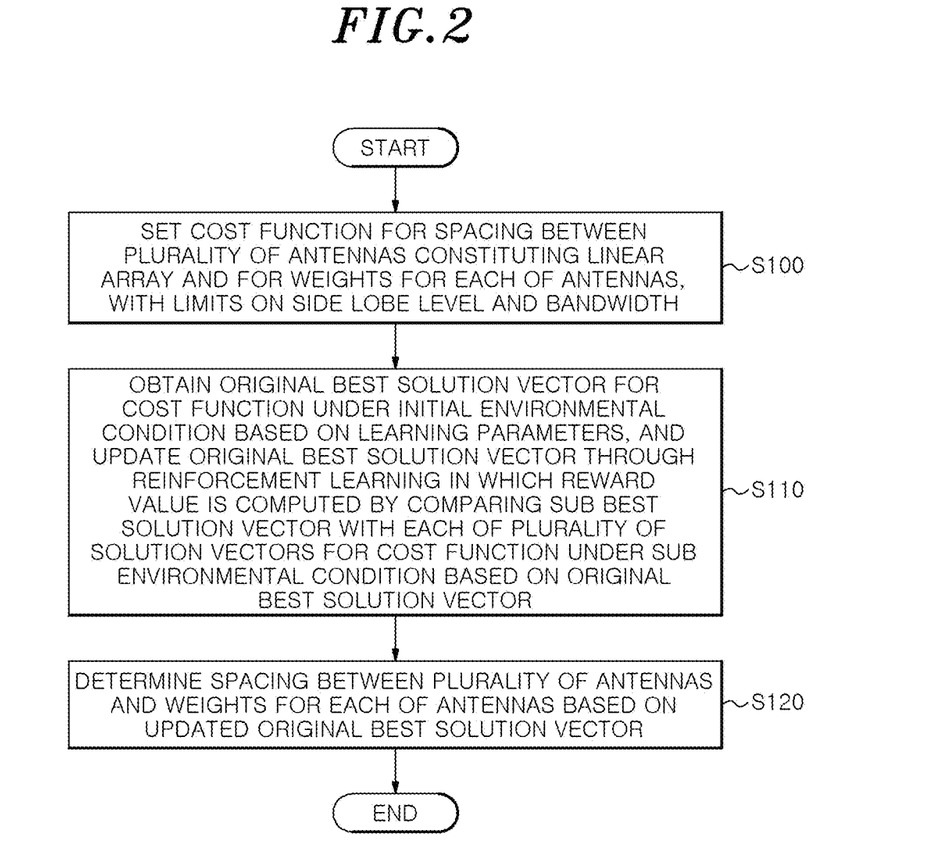
FIG. 2 is a control block diagram of a method for designing a non-uniformly spaced linear array antenna according to an exemplary embodiment of the present disclosure.
Figure 3:
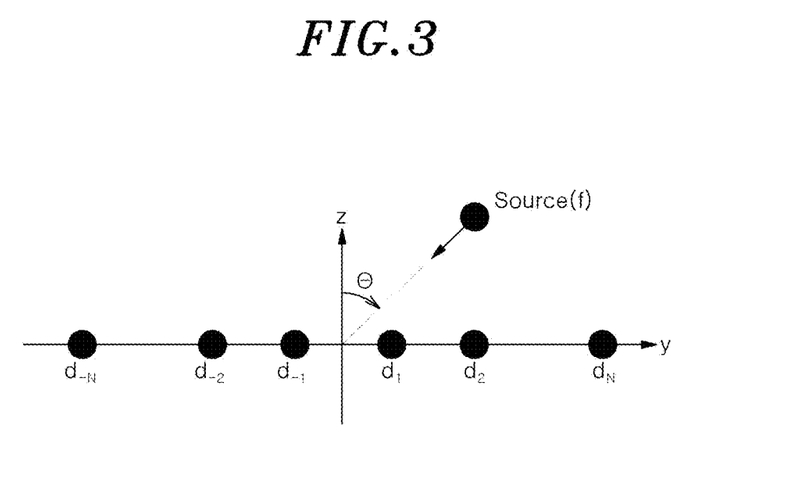
FIG. 3 is a view illustrating a structure of a non-uniformly spaced linear array antenna according to an exemplary embodiment of the present disclosure.

FIG. 2 is a control block diagram of a method for designing a non-uniformly spaced linear array antenna according to an exemplary embodiment of the present disclosure. FIG. 3 is a view illustrating a structure of a non-uniformly spaced linear array antenna according to an exemplary embodiment of the present disclosure.

First of all, the apparatus 100 for designing a non-uniformly spaced linear array antenna according to an embodiment of the present disclosure may set a cost function for spacing between a plurality of antennas constituting a linear array and for weights for each of the antennas, with limits on side lobe level and bandwidth (S100).

Referring to FIG. 3, a structure of a symmetrical linear array with 2N antennas is depicted, and $d_n$ is the distance between the origin and an n-th antenna (n=1, . . . , N). The non-uniformly spaced linear array antenna according to an embodiment of the present disclosure uses a non-uniformly spaced symmetrical linear array, and its array factor is defined as follows:

$$AF(\theta, w, d; f, \theta_0) = \sum_{n=1}^{N} w_n \cos(kd_n(\sin\theta - \sin\theta_0)) \quad \text{[Equation 1]}$$

where $w_n$ is the weight for the n-th antenna, $k(=2\pi/\lambda)$ is wavenumber, $\lambda(=c/f)$ is wavelength, c is propagation speed, f is operating frequency, $\theta$ is polar angle, and $\theta_0$ is scanning angle. In an embodiment of the present disclosure, a normalized array factor was used on a dB scale and defined as follows.

$$BP(\theta, w, d; f, \theta_0) = 20\log_{10}\left(\frac{|AP(\theta, w, d; f, \theta_0)|}{\max(|AF(\theta, w, d; f, \theta_0)|)}\right) \quad \text{[Equation 2]}$$

The method for designing a non-uniformly spaced linear array antenna according to an embodiment of the present disclosure uses a cost function that sets limits on bandwidth and side lobe level alone and, as a result, gives freedom to a beam pattern, which is given by the following formula:

$$f_{cost}(w, d; f, \theta_0) = \begin{cases} \int\int |BP_d(\theta; \theta_0) - BP(\theta, w, d; f, \theta_0)| d\theta &, \text{for } BP_d(\theta; \theta_0) < BP(\theta, w, d; f, \theta_0) \\ 0 &, \text{for } BP_d(\theta; \theta_0) \geq BP(\theta, w, d; f, \theta_0) \end{cases} \quad \text{[Equation 3]}$$

where $BP_d(\theta;\theta_0)$ is the limits on bandwidth and side lobe level at angle $\theta_0$, which is given by Equation 4:

$$BP_d(\theta; \theta_0) = \begin{cases} 0\text{dB}, & \text{for } -BW/2 + \theta_0 \leq \theta \leq BW/2 + \theta_0 \\ SLL, & \text{for otherwise} \end{cases} \quad \text{[Equation 4]}$$

where BW is bandwidth, SLL is side lobe level, and $\theta_0$ is scanning angle.

The apparatus 100 for designing a non-uniformly spaced linear array antenna may extend Equation 3 to a cost function computed for all frequency bands in order to find the spacing and weights for non-uniformly spaced linear array antennas that satisfy a desired bandwidth and side lobe level in all frequency bands when scanning a beam at a specific angle. Specifically, the cost function for all frequency bands of the apparatus 100 for designing a non-uniformly spaced linear array antenna is given by Equation 5.

$$f_{wide}(w, d; \theta_0) = \sum_{i=1}^{F} f_{cost}(w, d; f_i, \theta_0) \quad \text{[Equation 5]}$$

where $f_{cost}(f_i)$ is the cost value at operating frequency $f_i$, $f_t$ is i-th operating frequency, $f_{min}$ is minimum operating frequency, $\Delta f$ is frequency interval, and F is the number of operating frequencies.

The final cost function for designing a wideband array antenna allows for computing errors in which the bandwidth and side lobe level limits are not met, in a pattern for all frequency bands.

Next, the apparatus 100 for designing a non-uniformly spaced linear array antenna according to an embodiment of the present disclosure may obtain an initial best solution vector for the cost function under an initial environmental condition based on learning parameters, and may update the initial best solution vector through reinforcement learning in which a reward value is computed by comparing a sub best solution vector with each of a plurality of solution vectors for the cost function under a sub environmental condition based on the initial best solution vector (S110).

To this end, the apparatus 100 for designing a non-uniformly spaced linear array antenna according to an embodiment of the present disclosure may set parameters first. The parameters as used herein refer to all parameters used to design a non-uniformly spaced linear array antenna. The parameters according to an embodiment of the present disclosure may include at least one of a learning parameter used for reinforcement learning, a non-uniformly spaced linear array parameter related to the performance of a non-uniformly spaced linear array antenna, and a desired pattern parameter for a desired pattern.

The apparatus 100 for designing a non-uniformly spaced linear array antenna according to an embodiment of the present disclosure may store parameter values received from the outside and then used them when necessary, or may receive parameter values from a separate server via wired/wireless communication. On the contrary, the parameter values may be determined by internal operation of the apparatus 100 for designing a non-uniformly spaced linear array antenna.

After setting parameters, the apparatus 100 for designing a non-uniformly spaced linear array antenna according to an embodiment of the present disclosure may obtain an initial best solution vector for the cost function under an initial environmental condition based on the set parameters. Specifically, the apparatus 100 for designing a non-uniformly spaced linear array antenna according to an embodiment of the present disclosure may randomly generate a plurality of solution vectors under an initial environmental condition consisting only of the set parameters. Subsequently, the apparatus 100 for designing a non-uniformly spaced linear array antenna according to an embodiment of the present disclosure may input each of the generated solution vectors into the above set cost function. Lastly, the apparatus 100 for designing a non-uniformly spaced linear array antenna according to an embodiment of the present disclosure may obtain a solution vector for minimizing the cost function as the initial best solution vector.

After obtaining the initial best solution vector, the apparatus 100 for designing a non-uniformly spaced linear array antenna according to an embodiment of the present disclosure may update the initial best solution vector through reinforcement learning in which a reward value is computed by comparing a sub best solution vector with each of a plurality of solution vectors for the cost function under a sub environmental condition based on the initial best solution vector.

Specifically, the apparatus 100 for designing a non-uniformly spaced linear array antenna according to an embodiment of the present disclosure may check first whether an iteration stop condition is met or not. Here, the iteration stop condition is a condition for determining the number of iterations in reinforcement learning, which may be predetermined as a parameter, or may be defined depending on whether or not the initial best solution vector has a preset value or is within a preset range.

If the iteration stop condition is not met, the apparatus 100 for designing a non-uniformly spaced linear array antenna according to an embodiment of the present disclosure may change the parameters and repeatedly update the initial best solution vector based on the plurality of solution vectors under a sub environmental condition determined by the changed learning parameters.

Specifically, the apparatus 100 for designing a non-uniformly spaced linear array antenna according to an embodiment of the present disclosure may change the learning parameters first, among all the parameters. For example, a non-uniformly spaced linear array antenna according to an embodiment of the present disclosure may reduce a search space parameter, among the learning parameters, to a predetermined percentage. If the predetermined percentage is 99%, the search space parameter may be defined by the following Equation 6:

$$\beta = \beta_{t-1} \times 0.99 \quad \text{[Equation 6]}$$

where $\beta$ is the search space parameter, and t is the number of iterations.

After changing the parameters, the apparatus 100 for designing a non-uniformly spaced linear array antenna according to an embodiment of the present disclosure may repeatedly update the initial best solution vector based on a plurality of solution vectors under a sub environmental condition determined by the changed learning parameters. As used herein, the sub environmental condition refers to a condition comprising the above set parameters and the changed parameters, which may comprise a search range determined by the changed search space parameter with respect to the initial best solution vector.

The apparatus 100 for designing a non-uniformly spaced linear array antenna according to an embodiment of the present disclosure may randomly select the plurality of solution vectors within the changed search range, and a method of selection by the apparatus 100 for designing a non-uniformly spaced linear array antenna according to an embodiment of the present disclosure may be defined as in Equation 7:

$$\text{rand}(Q_{t-1}^{best}(s,a)-\beta; Q_{t-1}^{best}(s,a)+\beta)$$ [Equation 7]

where rand(a;b) is a function that uniformly takes a random value between a and b, $Q_t$ is the solution vector at the i-th iteration, and $Q_t^{best}$ is a sub best solution vector which minimizes the cost function at the t-th iteration.

After selecting a plurality of solution vectors under the sub environmental condition, the apparatus 100 for designing a non-uniformly spaced linear array antenna according to an embodiment of the present disclosure may compute the value of the cost function for each of the plurality of solution vectors and find a sub worst solution vector which minimizes the computed value of the cost function and the sub best solution vector which maximizes the computed value of the cost function. Next, the apparatus 100 for designing a non-uniformly spaced linear array antenna according to an embodiment of the present disclosure may compute a reward value according to Equation 8 after subtracting the sub worst solution vector from the plurality of solution vectors.

$$r_t = (Q_i^{best} - Q_i)/Q_t$$ [Equation 8]

v where $r_t$ is the reward value at the t-th iteration, $Q_t$ is the solution vector at the i-th iteration, and $Q_i^{best}$ is a sub best solution vector which minimizes the cost function at the t-th iteration.

After computing the reward value, the apparatus 100 for designing a non-uniformly spaced linear array antenna according to an embodiment of the present disclosure may update the initial best solution vector by applying the reward value to the initial best solution vector. Specifically, the apparatus 100 for designing a non-uniformly spaced linear array antenna according to an embodiment of the present disclosure may update the initial best solution vector according to Equation 9:

$$Q_t^{new} = (1-\alpha)Q_t + \alpha(r_t + \gamma Q_{t-1}^{best})$$ [Equation 9]

where $Q_t^{new}$ is the initial best solution vector that is updated at the t-th iteration, α is learning rate parameter, γ is discounting parameter, $r_t$ is the reward value at the t-th iteration, $Q_t$ is the solution vector at the i-th iteration, and $Q_t^{best}$ is a sub best solution vector which minimizes the cost function at the t-th iteration.

On the other hand, once the iteration stop condition is met, the apparatus 100 for designing a non-uniformly spaced linear array antenna according to an embodiment of the present disclosure may finish the reinforcement learning. In this manner, the apparatus 100 for designing a non-uniformly spaced linear array antenna according to an embodiment of the present disclosure may repeatedly update the initial best solution vector until the iteration stop condition is met.

Lastly, once the iteration stop condition is met, the apparatus 100 for designing a non-uniformly spaced linear array antenna according to an embodiment of the present disclosure may determine spacing between a plurality of antennas and weights for each of the antennas based on the updated initial best solution vector (S120).

Thus far, the method for designing a non-uniformly spaced linear array antenna according to an embodiment of the present disclosure has been described. Hereinafter, simulation results of the method for designing a non-uniformly spaced linear array antenna according to an embodiment of the present disclosure will be described.

Figure 4:
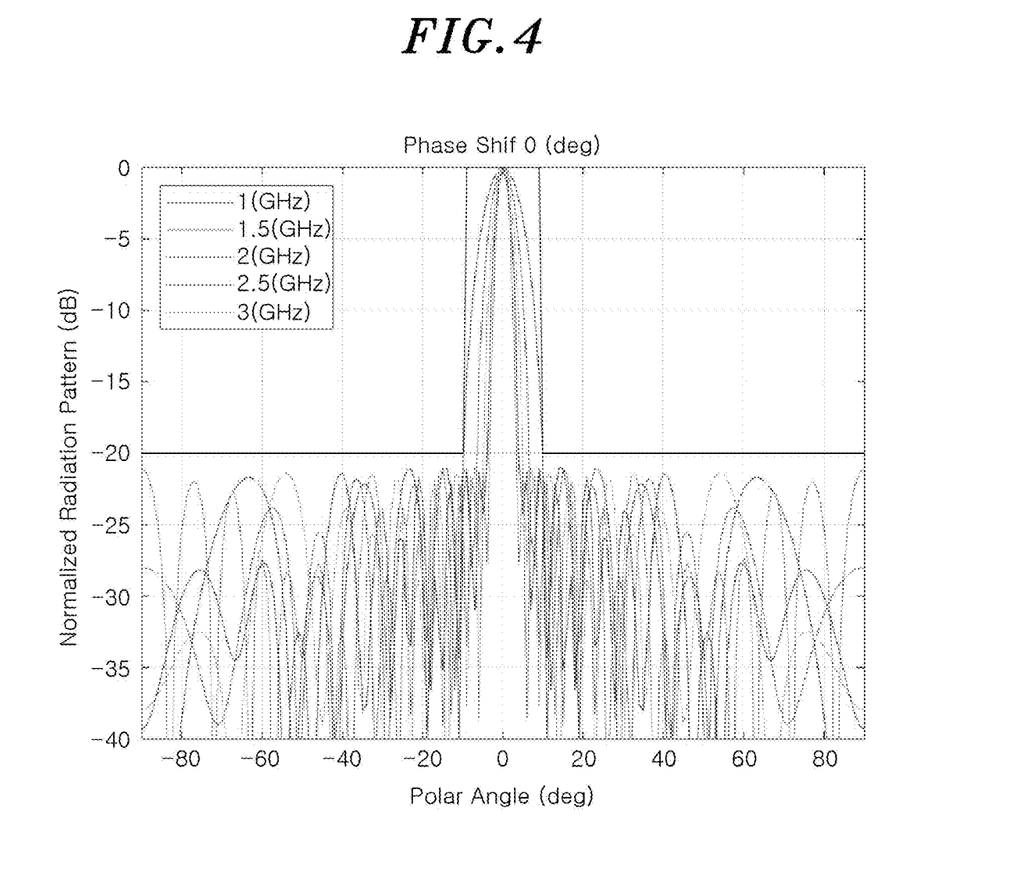
FIG. 4 shows one embodiment of a design pattern diagram according to the method for designing a non-uniformly spaced linear array antenna according to an embodiment of the present disclosure.
Figure 5:
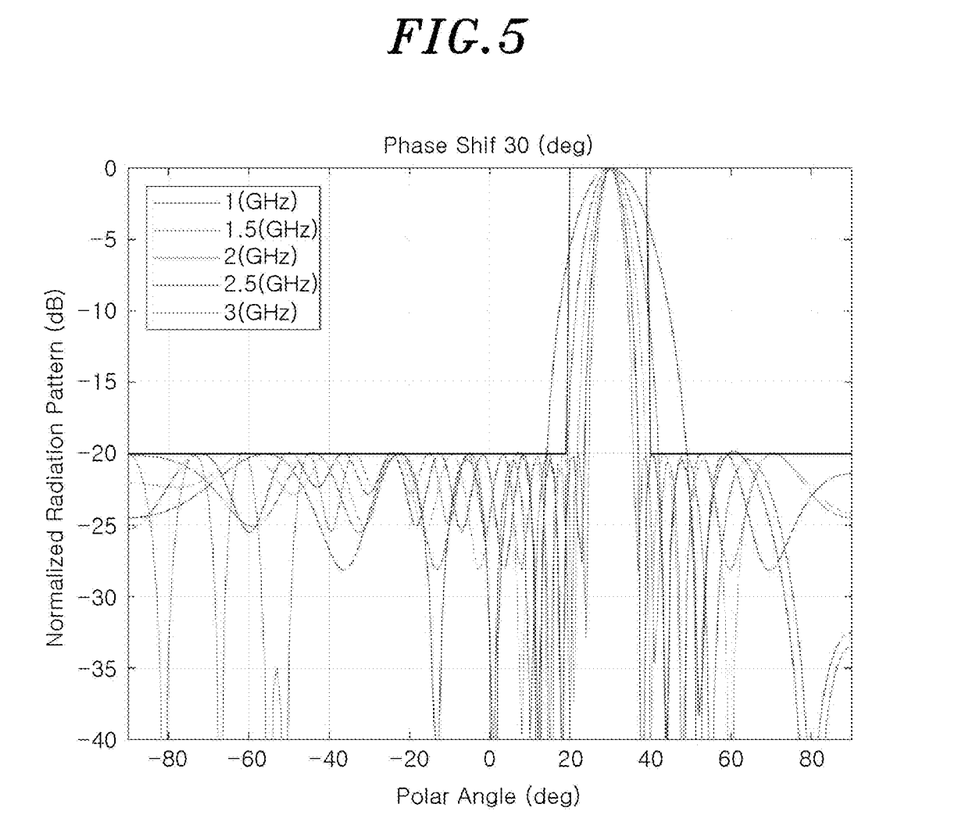
FIG. 5 shows another embodiment of a design pattern diagram according to the method for designing a non-uniformly spaced linear array antenna according to an embodiment of the present disclosure.
Figure 6:
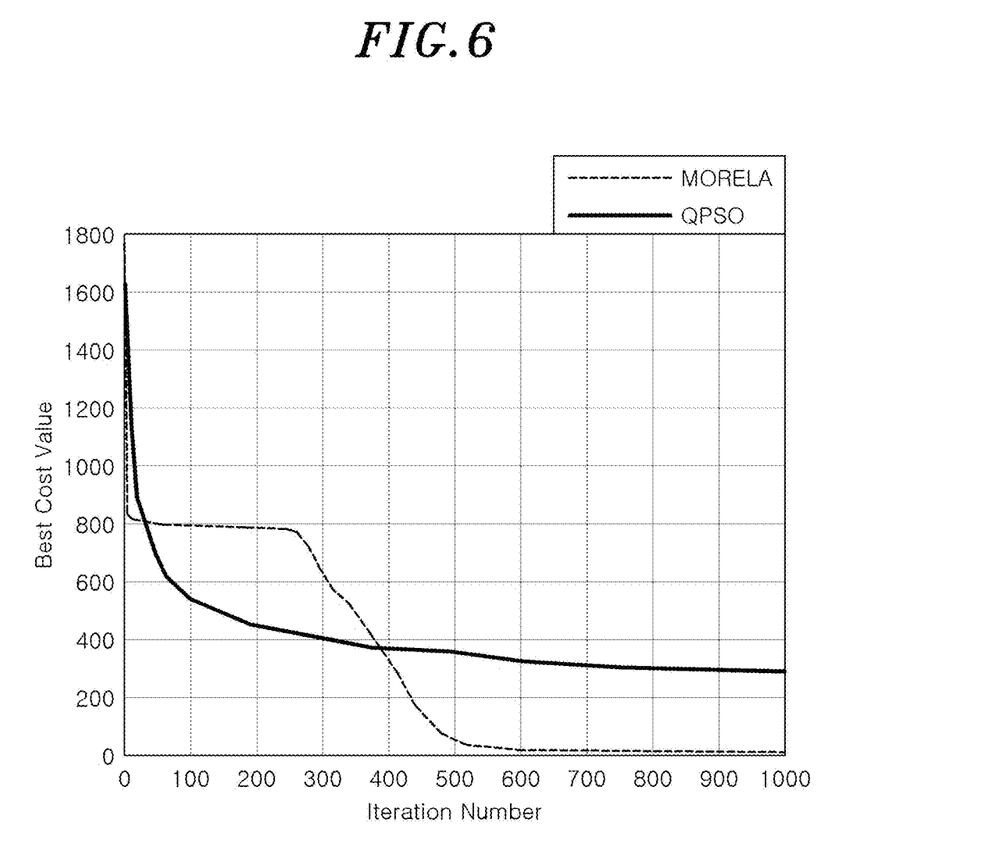
FIG. 6 is a view for explaining the relationship between the number of iterations and the best cost function value according to the method for designing a non-uniformly spaced linear array antenna according to an embodiment of the present disclosure.

FIG. 4 shows one embodiment of a design pattern diagram according to the method for designing a non-uniformly spaced linear array antenna according to an embodiment of the present disclosure. FIG. 5 shows another embodiment of a design pattern diagram according to the method for designing a non-uniformly spaced linear array antenna according to an embodiment of the present disclosure. FIG. 6 is a view for explaining the relationship between the number of iterations and the best cost function value according to the method for designing a non-uniformly spaced linear array antenna according to an embodiment of the present disclosure.

It is theoretically possible to find spacing and weights for non-uniformly spaced linear array antennas optimized for scanning a beam at a specific angle in a wide band, by using a MORELA. However, the minimum spacing between antennas was considered in a simulation according to an embodiment of the present disclosure, since it is necessary to ensure the minimum spacing between antennas when manufacturing an array antenna. The parameters used in the simulation according to an embodiment of the present disclosure are as follows: the number m of initial best solution vectors was 15, the maximum number T of iterations was 1000, the learning rate parameter α was 0.8, the search space parameter β was 0.2, the discounting parameter was 0.2, the number of non-uniformly spaced linear array antennas was 20(N=10), the minimum frequency $f_{min}$ was 1 GHz, the maximum frequency $f_{max}$ was 3 GHz, the frequency interval Δf was 0.5 GHz, the minimum/maximum spacing between antennas was 52/152 mm, and the propagation speed c was $3\times10^3$. The limits on bandwidth and side lobe level were set to 20 deg and −20 dB, respectively. The initial value of the antenna spacing was set to a random value between 52 mm and 152 mm, and the initial values of the weights were set to a random value between 0 and 1.

FIGS. 4 and 5 show a beam pattern for spacing and weights for non-uniformly spaced linear array antennas, obtained for scanning a beam at broadside and at a specific angle ($\theta_0$=30 deg) in a wide band by using a MORELA. FIG. 6 shows the average performance values of a MORELA and a QPSO algorithm on finding global optimum, which were obtained through 100 iterations by the apparatus 100 for designing a non-linearly spaced linear array antenna, when scanning a beam at broadside in a wide band.

As seen from above, the above-described method for designing a non-linearly spaced linear array antenna may enable a design optimized for scanning a beam at a specific angle in a wide band, by using reinforcement learning to find spacing and weights for linear array antennas. Moreover, this method may make up for the drawbacks of existing cost functions for fitting a specific pattern, by using a cost function that sets limits on bandwidth and side lobe level alone, without use of a specific pattern. Furthermore, the use of a reinforcement algorithm may allow for the design of a non-uniformly spaced linear array antenna with high performance compared with a conventional quantum particle swarm optimization (QPSO) algorithm.

In the meantime, the method according to the various embodiments above mentioned may be implemented as a non-transitory computer-readable storage medium including computer executable program, wherein the computer executable program, when executed by a processor, may cause the processor to perform the steps of the method.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A method for designing a non-uniformly spaced linear array antenna, the method comprising:
   setting a cost function for spacing between a plurality of antennas comprised in a linear array and for weights for each of the antennas, with limits on side lobe level and bandwidth;
   obtaining an initial best solution vector for the cost function under an initial environmental condition based on learning parameters;
   updating the initial best solution vector through reinforcement learning in which a reward value is computed by comparing a sub best solution vector with each of a plurality of solution vectors for the cost function under a sub environmental condition based on the initial best solution vector; and
   determining the spacing between the plurality of antennas and the weights for each of the antennas based on the updated initial best solution vector.

2. The method of claim 1, wherein the updating of the initial best solution vector comprises, in response to a preset iteration stop condition not being met, changing the learning parameters and repeatedly updating the initial best solution vector based on the plurality of solution vectors under a sub environmental condition determined by the changed learning parameters, and
   the determining of the spacing between the plurality of antennas and the weights for each of the antennas comprises, in response to the iteration stop condition being met, determining the spacing between the plurality of antennas and the weights for each of the antennas based on the updated initial best solution vector.

3. The method of claim 2, wherein the repeatedly updating of the initial best solution vector comprises:
   in response to the iteration stop condition not being met, changing the learning parameters;
   computing the reward value by comparing the sub best solution vector with the plurality of solution vectors under a sub environmental condition determined by the changed learning parameters; and
   repeatedly updating the initial best solution vector based on the reward value.

4. The method of claim 3, wherein the computing of the reward value comprises:
   randomly selecting the plurality of solution vectors within a search range determined by the changed learning parameters;
   computing the value of the cost function for each of the plurality of solution vectors; and
   finding a sub worst solution vector which minimizes the computed value of the cost function and the sub best solution vector which maximizes the computed value of the cost function; and
   determining, as the reward value, the difference rate between the sub best solution vector for each of the plurality of solution vectors from which the sub worst solution vector is subtracted and each of the plurality of solution vectors from which the sub worst solution vector is subtracted.

5. The method of claim 3, wherein, in the changing of the learning parameters, in response to the iteration stop condition not being met, a search space parameter, among the learning parameters, is reduced to a predetermined percentage.

6. The method of claim 5, wherein the calculating of the reward value comprises determining, as the sub environmental condition, a search range determined by the changed search space parameter with respect to the initial best solution vector.

7. The method of claim 1, wherein the cost function is a function that computes errors in which the bandwidth and side lobe level limits are not met when scanning a beam pattern for all frequency bands at a specific angle.

8. A non-transitory computer-readable recording medium storing a computer program, comprising instructions for executing, by a processor, a method for designing a non-uniformly spaced linear array antenna, the method comprising:
   setting a cost function for spacing between a plurality of antennas comprised in a linear array and for weights for each of the antennas, with limits on side lobe level and bandwidth;
   obtaining an initial best solution vector for the cost function under an initial environmental condition based on learning parameters;
   updating the initial best solution vector through reinforcement learning in which a reward value is computed by comparing a sub best solution vector with each of a plurality of solution vectors for the cost function under a sub environmental condition based on the initial best solution vector; and
   determining the spacing between the plurality of antennas and the weights for each of the antennas based on the updated initial best solution vector.

9. The medium of claim 8, wherein the updating of the initial best solution vector comprises, in response to a preset iteration stop condition not being met, changing the learning parameters and repeatedly updating the initial best solution vector based on the plurality of solution vectors under a sub environmental condition determined by the changed learning parameters, and
   the determining of the spacing between the plurality of antennas and the weights for each of the antennas comprises, in response to the iteration stop condition being met, determining the spacing between the plurality of antennas and the weights for each of the antennas based on the updated initial best solution vector.

10. The medium of claim 9, wherein the repeatedly updating of the initial best solution vector comprises:
    in response to the iteration stop condition not being met, changing the learning parameters;
    computing the reward value by comparing the sub best solution vector with the plurality of solution vectors under a sub environmental condition determined by the changed learning parameters; and
    repeatedly updating the initial best solution vector based on the reward value.

11. The medium of claim 10, wherein the computing of the reward value comprises:
    randomly selecting the plurality of solution vectors within a search range determined by the changed learning parameters;
    computing the value of the cost function for each of the plurality of solution vectors; and finding a sub worst solution vector which minimizes the computed value of the cost function and the sub best solution vector which maximizes the computed value of the cost function; and determining, as the reward value, the difference rate between the sub best solution vector for each of the plurality of solution vectors from which the sub worst solution vector is subtracted and each of the plurality of solution vectors from which the sub worst solution vector is subtracted.

12. The medium of claim 10, wherein, in the changing of the learning parameters, in response to the iteration stop condition not being met, a search space parameter, among the learning parameters, is reduced to a predetermined percentage.

13. The medium of claim 12, wherein the calculating of the reward value comprises determining, as the sub environmental condition, a search range determined by the changed search space parameter with respect to the initial best solution vector.

14. The medium of claim 8, wherein the cost function is a function that computes errors in which the bandwidth and side lobe level limits are not met when scanning a beam pattern for all frequency bands at a specific angle.

* * * * *